Patented Nov. 14, 1950

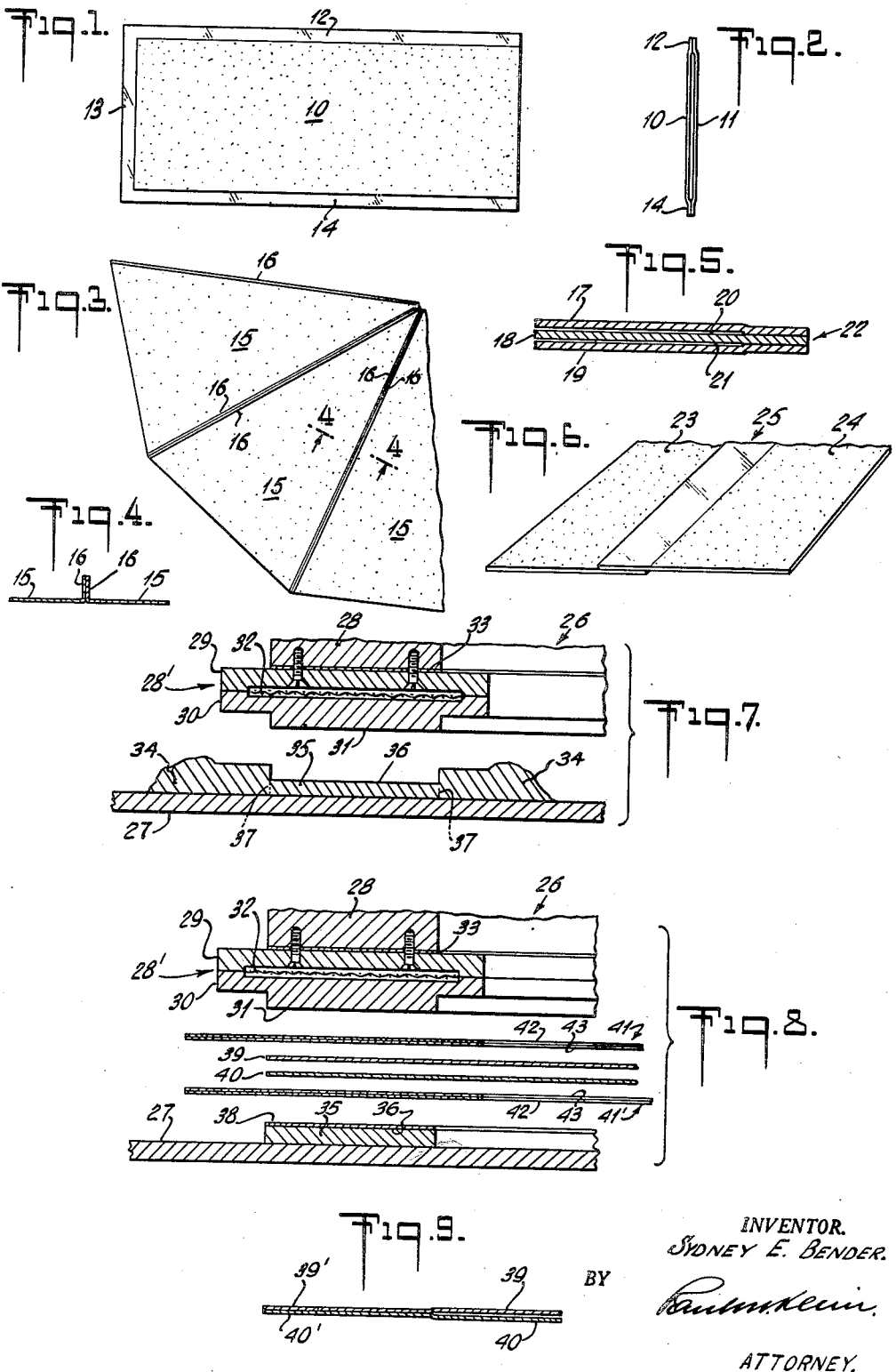

2,530,221

UNITED STATES PATENT OFFICE 2,530,221

DEVICE FOR PRESSURE AND HEAT SEALING OF PLASTICS

Sydney E. Bender, Brooklyn, N. Y.

Application March 3, 1945, Serial No. 580,910

5 Claims. (Cl. 154—42)

This invention relates generally to the art of seaming, sealing or otherwise joining elements of thermoplastic material, such as two or more superimposed layers of such material, and particularly deals with joints produced by the application of heat and pressure to the elements intended to be united and the method and devices employed for producing such joints.

One of the prime objects of the present invention is to provide what may be termed a cementless, "permanent," non-tearing seam or joint between two or more thermoplastic elements, which seam or joint has a breaking strength greater or at least as great as each of the elements united, and wherein the joint is concise in its peripheral contours, and wherein the outer surface of the joined area attains the physical properties of being smooth, as compared with the relative roughness of the original element surfaces before the elements are joined, while at the same time the joined portion becomes either transparent or highly translucent, as compared with the original opaqueness or poor translucency of the material portions prior to completing the joint.

Another object of this invention is the method employed for producing a "permanent" seal, seams or joints of the aforesaid superior qualities in uniting two or more thermoplastic elements.

A further object of this invention is the provision of means or devices whereby the aforesaid method may be practiced.

In order to produce a perfect, "permanent," cementless joint it is essential that the portions of the material forming the joint are subjected to a sufficient amount of uniform pressure and heat over exactly and the entire area which is to form the joint. To control the uniformity in the application of both pressure and heat, certain prerequisites are essential. In the first place the pressure surfaces by means of which pressure and heat is applied to the future joint must be of the exact size and area corresponding to such future joint, and the contours of both pressure surfaces must be exact replicas of one another. The application of heat must be so controlled that ample heat is applied to the area to be joined, but such heat must be quickly and uniformly distributed over the outer faces of the future joint and excess heat must be quickly dissipated in outward direction from the joined portions of the thermoplastic to prevent overheating.

With the foregoing general explanation noted, the principle of the present invention will be more readily understood from the ensuing description in conjunction with the accompanying drawings, which latter are held in purely diagrammatical form and are designed to serve for explanatory purposes only, without in any way limiting this invention to the specific showing, and in which:

Fig. 1 is a plan view of a bag made of thermoplastic material with three of its edges permanently joined according to the present invention;

Fig. 2 is an end view of the bag;

Fig. 3 is a portion of an umbrella covering, the sections of which are joined by the present method;

Fig. 4 is a partial cross section taken on line 4—4 of Fig. 3;

Fig. 5 is a typical cross section of three layers of plastic sheets permanently joined along one of their edges;

Fig. 6 is a perspective illustration of two sheets of plastic overlapped and joined with each other along their edges;

Fig. 7 is a cross section through a fragmental portion of a press for producing a permanent joint;

Fig. 8 is an illustration similar to that shown in Fig. 7; and

Fig. 9 is a cross section through two permanently joined layers of thermoplastic material.

Referring now specifically to the figures, Figs. 1 and 2 disclose a gab made of thermoplastic sheets 10 and 11, which are seamed or joined together along three of their edges 12, 13 and 14. It will be observed that the joined edge area is shown clear, indicating its transparency or high translucency, as compared with the original opaqueness of the sheet bodies 10 and 11. It is to be noted that in Fig. 2 the interior portions of the sheets are shown separated, although in actual practice such separation is not readily evident, the inner faces of the sheets remaining in close adjacency to each other after the edge-sealing operation, unless they are forcibly separated.

Referring now to Figs. 3 and 4, these illustrations portray a portion of a thermoplastic umbrella covering composed of segments 15, the edges 16 of which are elevated and joined with one another. These joined edges become not only either transparent or highly translucent, but attain substantial strength and are therefore admirably suited for attaching to them the ribs of the umbrella frame.

In order to indicate that more than two sheets of thermoplastic material may be joined, Fig. 5 illustrates three such joined sheets, 17, 18 and 19. Also these sheets are shown separated at 20 and 21, but actually they are as close together as are their seamed edges 22. As a matter of fact the thickness of the unseamed portions is exactly or practically exactly the same as the combined thickness of the seamed edge, the spacing being provided merely to clarify the fact that the unsealed portions are separated, and that the joint areas are exactly defined.

In Fig. 6 two sheets 23 and 24 are shown being united along their respective edges at 25, which edges are overlapped and sealed with each other. It will be observed that the joined portion connecting the two sheets is clear, whereas the free portions of the sheets are opaque.

In the aforedescribed figures, seams, seals or joints in various forms are illustrated. Each one of them is produced without the application of any binder, cement or solvent, the union between the elements depending entirely upon the correct application of pressure and heat, whereby a "permanent," non-tearable joint is produced, the strength of which exceeds the tearing strength of the seamed elements.

In order to produce such "permanent" joints in thermoplastic material, the pressure as well as the heat applied to the portions to be joined must be controlled, and such control may be exercised only by a careful preparation of the instrumentalities employed to effect joints of the desired quality.

In Figs. 7 and 8 there are illustrated portions of a press consisting of what may be termed an operative plunger or ram 26 and a fixed matrix support 27. The plunger comprises a frame 28 to which is attached a heated pressure member 28' composed of an upper portion 29 and a lower, heat-conductive portion 30, the latter having an extension or die provided with a pressure surface 31. The two members 29 and 30 are interiorly recessed for the reception of a heating element 32, which is electrically insulated from the material of both members. Frame 28 is heat-insulated from pressure member 28', as shown at 33.

As stated before, it is essential that the application of pressure and heat must be uniform over the entire area of the future joint. To this end it is essential that both surfaces intended for exerting pressure against the plastic must be designed to exactly cooperate with one another at every point over their entire pressure areas. In other words pressure surface 31 of the plunger must have an exact counterpart in a fixed matrix, and the latter's pressure surface contour must match that of pressure surface 31. For this reason it is essential to provide a matrix with a pressure surface which is an exact negative reproduction of die pressure surface 31. One of the simplest ways found is to apply a readily hardenable plastic 34 over base 27 and to move plunger 26 toward the base so that the extension of lower plunger member 30 makes an impression in the plastic. Thus a true negative reproduction of pressure surface 31 is impressed into the material of the future matrix 35 to eventually serve as the desired counterpressure surface 36. The plunger is retained in its depressed position until the plastic on base 27 sets. Now the portions of excess plastic material along both sides of dotted lines 37, indicated in Fig. 7, is removed, while plunger 26 still remains in its lowered position. The sides of the thus produced plastic matrix 35 are trued up, and the matrix material is permitted to harden. The removal of surplus plastic at both sides of the matrix and the truing up of its sides is essential for the next following steps in the procedure, reference being had to Fig. 8, in which the finished matrix is shown.

The matrix now being ready for use, a heat barrier in the form of a thin, smooth, non-heat-conductive or heat resistant covering 38 is applied to the unheated lower pressure surface 36 of the matrix. This covering, made for instance from fibre, must have the property of yielding to applied pressure and to conform exactly to the contour imparted to it when pressure surface 31 is forced against matrix surface 36. The next step deals with the fusion or sealing of thermoplastic elements. For example, two layers 39 and 40 of thermoplastic material are placed between the two pressure surfaces so that their outer left-hand edges are aligned with the left-hand edges of the upper and lower pressure surfaces, it being intended that the portion of the layers to be united substantially exactly corresponds in shape and area to that of these two pressure surfaces.

For the purpose of assuring a rapid and uniform distribution of heat over the entire sealing area of the two layers, and to prevent overheating of that area, a pair of thin sheets 41 and 41' are employed. These sheets are composed of a non-heat conductive base 42, one surface 43 of which is metallized. This metallized surface or foil is of a high finish and is highly heat-conductive. The metallized area of the sheets is substantially greater than the sealing area of the thermoplastic layers. These sheets are interposed with their non-metallic bases 42 facing pressure surface 31 and cover 38, while their metallized portions face the outer surfaces of layers 39 and 40.

When the layers and sheets rest in their proper position upon cover 38 and pressure member 28' is sufficiently heated, the latter is brought down against matrix 35. Depending upon the thickness, the physical properties and chemical composition of the plastic layers, the period of compression and application of heat may range from a few to 18 to 20 seconds, to produce a uniform, perfect and "permanent" joint. Now plunger 26 is elevated and the united layers are permitted to cool at room temperature. During the compression period, the heat generated in pressure member 28' is transmitted through upper sheet 41 to the plastic layers 39 and 40 and is reflected by the metallized surface 43 of lower sheet 41'. Cover 38 prevents or very much retards heat transmission to matrix 35 and to base 27. The smoothness of the metallized surfaces 43 of sheets 41 and 41' is reproduced upon the outer surfaces of the sealing areas of layers 39 and 40.

Since metallized surfaces 43 of sheets 41 and 41' are far larger in area than the sealing area of the layers, heat is quickly dissipated by them from that sealing area, thereby preventing an overheating of the latter, while providing a sufficient amount of evenly distributed heat for effecting a perfect, unbreakable union between the two thermoplastic layers.

Due to the fact that the area of the joint exactly corresponds to the areas of the two pressure surfaces, the marginal or peripheral lines of the joint are also defined exactly. The heat seal uniting the two thermoplastic layers is absolutely uniform over its entire area due to the fact that the lower pressure surface of cover 38 is an exact replica in size, area and contour of upper pressure surface 31.

The thus joined layers are illustrated in Fig. 9 showing the sealed portions 39' and 40' united uniformly along their entire inner surfaces, whereas the unsealed portion is shown seperated at the right, although that separation is highly exaggerated.

Figs. 7 and 8 are intended to diagrammatically portray parts of a device as may be employed to produce, for instance, a bag shown in Fig. 1, which parts are obviously enlarged over the size which would be required to produce the small bag indicated.

It is to be understood that while the foregoing describes certain specific ways of producing matrix 35 with a correct counter-pressure surface 36, other means may be employed to effect equal or better results. Similarly only one heated pressure surface is indicated in Figs. 7 and 8, whereas the matrix is shown unheated, for which reason use is made of insulating covering 38 placed over the matrix. It is quite obvious however that a heated matrix may be substituted.

Metallized sheets 41 and 41' are preferably of the known metallized paper type. They possess the advantage of providing a heat resistant surface at one face which is exposed to the heated pressure surface, whereas its metallized face not only imparts smoothness to the joint to be produced, but also quickly equalizes the heat over the joined area and dissipates excessive heat from that area. Such dissipation of heat is particularly noticeable when pressure is somewhat reduced between the two pressure surfaces.

An important advantage in the employment of metallized paper sheets resides in the fact that when they are used according to the present invention, the resulting sealing area, although precise in its outline, is by no means cut or marred as would be the case when only metal sheets corresponding in size and area to the future sealing area would be employed, or if the sealing procedure would take place by using the two pressure surfaces directly without the interposition of metallized sheet elements.

Another very important advantage in the use of the metallized paper sheets is found in the fact that the heat applied through them to the plastic sheets to be united becomes uniformly distributed over, and so to speak concentrated just within the area corresponding to the pressure areas between which the compression takes place, but this heat is quickly dissipated away from that area the moment the pressure is even slightly reduced.

It is to be noted that the smoothness of the joints between two or more plastic sheets depends upon the degree of smoothness of the metallized surfaces, and when these surfaces possess a very high gloss they naturally will leave a very smooth impression upon the united sheet area. Similarly affected is the transparency of the joint. When the surfaces of the metallized sheets are relatively rough they will leave a rough impression in the thermoplastic and its transparency will be lessened, as compared with the transparency of a compressed area when the impression is made by highly smooth metallized surfaces.

In Figs. 7 and 8 pressure member 28' is shown heated by an electric element 32. It is obvious, however, that heat may be supplied to the pressure surfaces by other means such as a gas flame, heated gases, or other heat sources. Likewise it is possible to apply heat directly to the compressed thermoplastic material by the use of high frequency electric currents.

It is to be observed that in the present method of effecting a permanent joint between thermoplastic material no solvent or cement is used, and only pressure and heat are depended upon to form a perfect union between two or more plastic layers.

From the foregoing it is quite evident that this invention is by no means limited to the specific illustrations and their description, and by the same token shall not be limited to producing permanent heat pressure seals between elements of the thermoplastics mentioned herein, for which reason it is to be understood that changes, substitutions and improvements may be made, without departing from the broad scope of this invention as defined in the annexed claims.

I claim:

1. In a device for permanently heat-sealing two or more items of thermoplastic material, two cooperating pressure members having precisely co-acting pressure surfaces, the pressure surface of one of the members being substantially an exact negative reproduction of the pressure surface of the other member, heat absorbing and heat dissipating elements for interposition between the pressure surfaces and the outer faces of the thermoplastic items to be heat-sealed, and means for applying heat to these items while being held between said elements under pressure by said surfaces.

2. In a device as per claim 1, said elements comprising highly smooth-surfaced layers of heat-conductive material.

3. In a device as per claim 1, said elements comprising combination layers of non-heat-conductive and heat-conductive materials and wherein the outer surfaces of the heat-conductive material intended to contact with the faces of the thermoplastic items are smooth.

4. In a device as per claim 1, said heat-applying means being associated with at least one of the pressure members, and a relatively thin heat-insulating element placed upon the pressure surface of the unheated pressure member.

5. In a device as per claim 1, one of the pressure members being made of heat-conductive material, the other pressure member being made from non-heat-conductive, hardened plastic.

SYDNEY E. BENDER.

REFERENCES CITED

The following references are of record in the file of this patent:

UNITED STATES PATENTS

| Number | Name | Date |
|---|---|---|
| 1,136,380 | Terry | Apr. 20, 1915 |
| 1,997,268 | Scharpf | Apr. 9, 1935 |
| 2,213,744 | Robertson | Sept. 3, 1940 |
| 2,238,342 | Riehl | Apr. 15, 1941 |
| 2,289,618 | Young | July 14, 1942 |
| 2,324,068 | Crandell | July 13, 1943 |
| 2,354,714 | Strickland Jr. | Aug. 1, 1944 |
| 2,360,703 | Molins et al. | Oct. 17, 1944 |
| 2,380,365 | Morrison et al. | July 10, 1945 |
| 2,401,991 | Walton | June 11, 1946 |
| 2,453,185 | Bilhuber | Nov. 9, 1948 |